(12) United States Patent
Van Wagoner

(10) Patent No.: US 8,581,083 B2
(45) Date of Patent: *Nov. 12, 2013

(54) STRINGED INSTRUMENT PRACTICE DEVICE

(75) Inventor: Gavin Van Wagoner, Salt Lake City, UT (US)

(73) Assignee: Pocket Strings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,835

(22) Filed: Dec. 7, 2011

(65) Prior Publication Data

US 2012/0073419 A1    Mar. 29, 2012

Related U.S. Application Data

(63) Continuation of application No. 12/904,861, filed on Oct. 14, 2010, now Pat. No. 8,124,863.

(60) Provisional application No. 61/261,616, filed on Nov. 16, 2009.

(51) Int. Cl.
*G10D 3/06*    (2006.01)

(52) U.S. Cl.
USPC ........................................ 84/314 R; 84/293

(58) Field of Classification Search
USPC ............... 84/314 R, 267, 290, 293
See application file for complete search history.

(56) References Cited

U.S. PATENT DOCUMENTS

| | | | |
|---|---|---|---|
| 936,181 A | 10/1909 | Steckelberg | |
| 1,841,398 A | 1/1932 | Bergh | |
| 1,848,920 A | 3/1932 | Watson | |
| 1,993,647 A | * 3/1935 | Cerrone | ........................ 84/306 |
| 3,218,904 A | 11/1965 | Hartman | |
| 3,403,590 A | 10/1968 | Quinton | |
| 3,668,967 A | 6/1972 | Malis | |
| 4,031,801 A | 6/1977 | Cecchini | |
| 4,065,995 A | 1/1978 | Greer | |
| 4,112,804 A | 9/1978 | Cecchini | |

(Continued)

FOREIGN PATENT DOCUMENTS

GB    2419218 A    4/2006

OTHER PUBLICATIONS

Notice of Allowance from U.S. Appl. No. 12/904,861 mailed Oct. 18, 2011.

(Continued)

*Primary Examiner* — Jianchun Qin
(74) *Attorney, Agent, or Firm* — Michael B Dodd; Dodd Law Group

(57) ABSTRACT

The present invention extends to handheld practice devices for practicing to play stringed instruments. More specifically, the present invention relates to a practice device that may assist a user in learning how to properly finger and play a stringed musical instrument. A user can hold an elongate handle and place one or more of his or her fingers on strings to practice fingerings that are used to play chords/notes. Real instrument strings can be used, helping to strengthen a user's fingertips and get the fingertips accustomed to holding/pinching the instrument strings. Further, the stringed instrument practice device can be portable and sized to fit within the user's hand. Accordingly, a user can realize advantages of the invention and utilize practice methods while the user is "on the go," riding on a bus, watching television, waiting in line, etc.

20 Claims, 11 Drawing Sheets

(56) References Cited

U.S. PATENT DOCUMENTS

| | | |
|---|---|---|
| D284,203 S | 6/1986 | Landau |
| D327,288 S | 6/1992 | Oreo |
| 5,756,914 A * | 5/1998 | Streibl ............... 84/465 |
| 5,952,593 A * | 9/1999 | Wilder ............... 84/314 R |
| 5,952,595 A | 9/1999 | Carnell |
| D425,106 S | 5/2000 | Park |
| 6,127,615 A | 10/2000 | Rosenberg |
| 6,452,080 B1 | 9/2002 | Coonce |
| 6,452,081 B1 | 9/2002 | Ravagni et al. |
| 6,911,011 B2 | 6/2005 | Haag |
| 7,064,260 B2 | 6/2006 | Willard |
| D529,092 S | 9/2006 | Ambrose, Sr. |
| 7,157,633 B1 | 1/2007 | Kopesec |
| 7,230,175 B2 | 6/2007 | Whiteside |
| 7,262,354 B2 | 8/2007 | Orred et al. |
| 7,304,224 B1 | 12/2007 | Bettis et al. |
| D574,037 S | 7/2008 | LeGrady et al. |
| 7,598,449 B2 | 10/2009 | Sullivan |
| 7,897,866 B2 | 3/2011 | Sullivan |
| 8,022,288 B2 | 9/2011 | Sullivan |
| 8,173,887 B2 | 5/2012 | Sullivan |
| 8,415,550 B2 | 4/2013 | Sullivan |
| 2005/0039592 A1 | 2/2005 | Willard |
| 2005/0109196 A1 | 5/2005 | Whiteside |
| 2007/0012159 A1 * | 1/2007 | Babicz ............... 84/307 |
| 2008/0105108 A1 | 5/2008 | Saenz |
| 2010/0083808 A1 | 4/2010 | Sullivan |
| 2012/0132057 A1 | 5/2012 | Kristensen |
| 2013/0180389 A1 | 7/2013 | Sullivan |

OTHER PUBLICATIONS

"Written Opinion of the International Searching Authority", Mailed Date: Jul. 17, 2012 Application No. PCT/US2012/029897, Filed Date: Mar. 21, 2012, pp. 5.

Notice of Allowance, U.S. Appl. No. 13/424,134, mailing date Apr. 4, 2013, pp. 14.

* cited by examiner

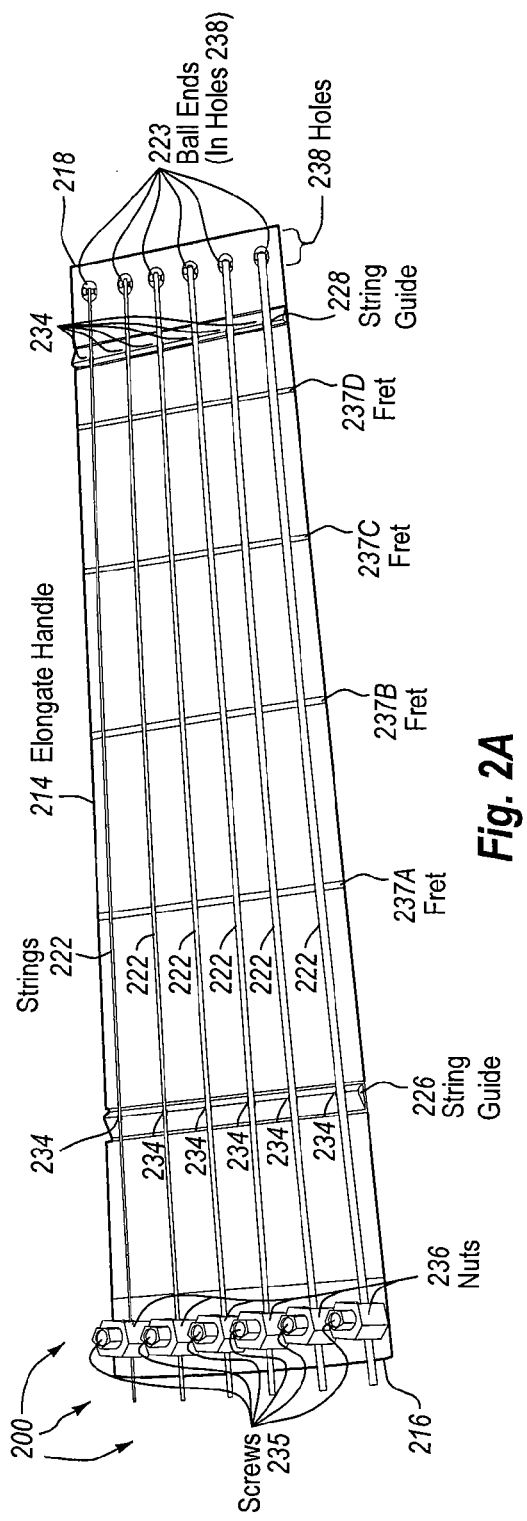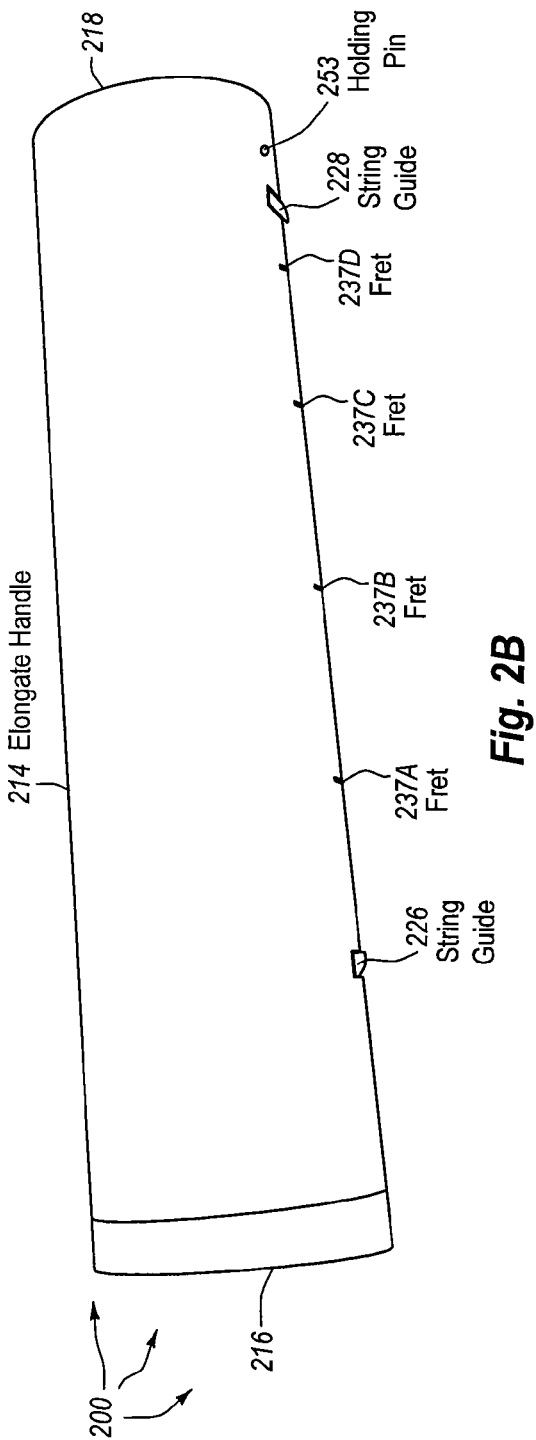
Fig. 2A
Fig. 2B

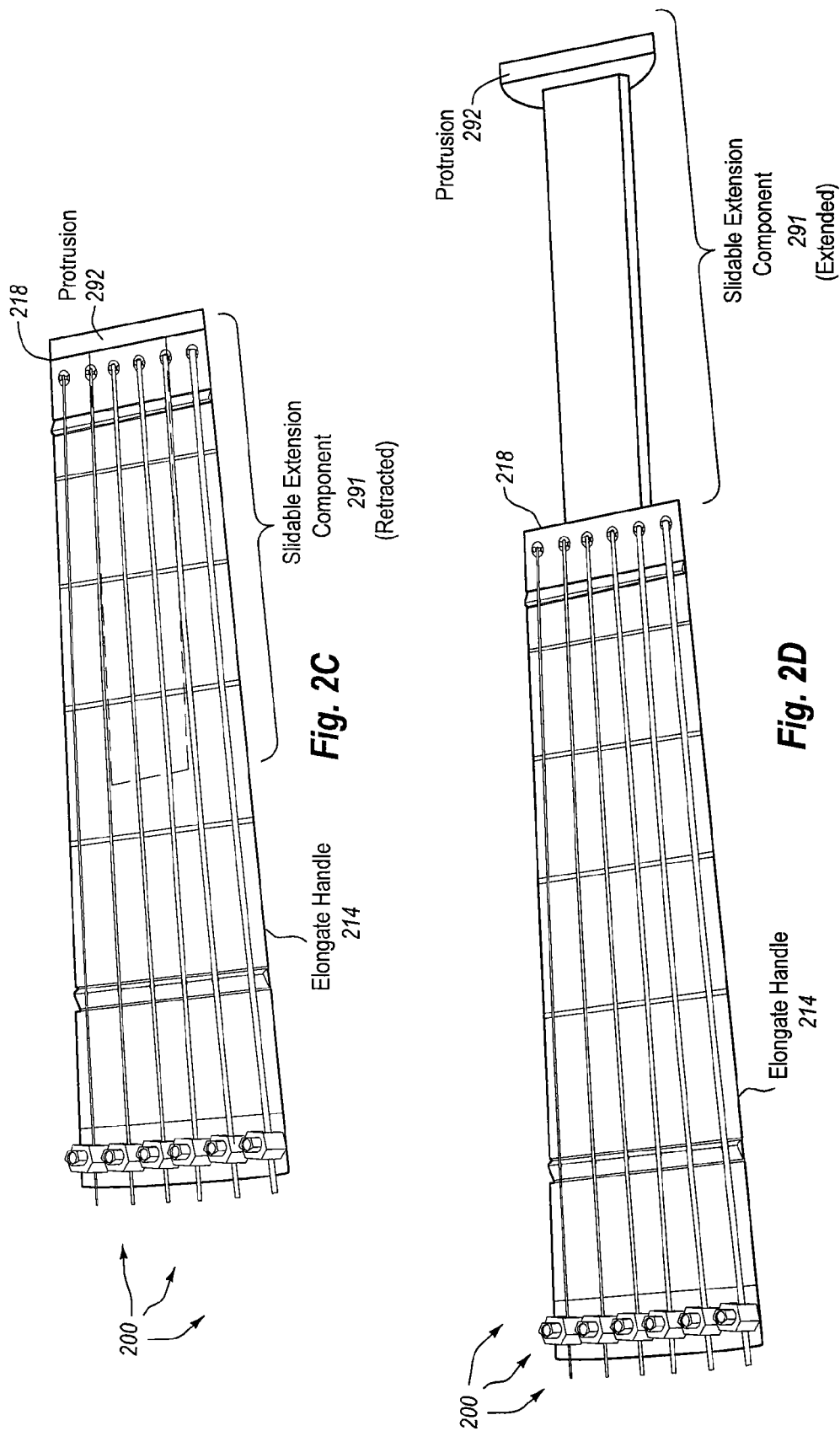

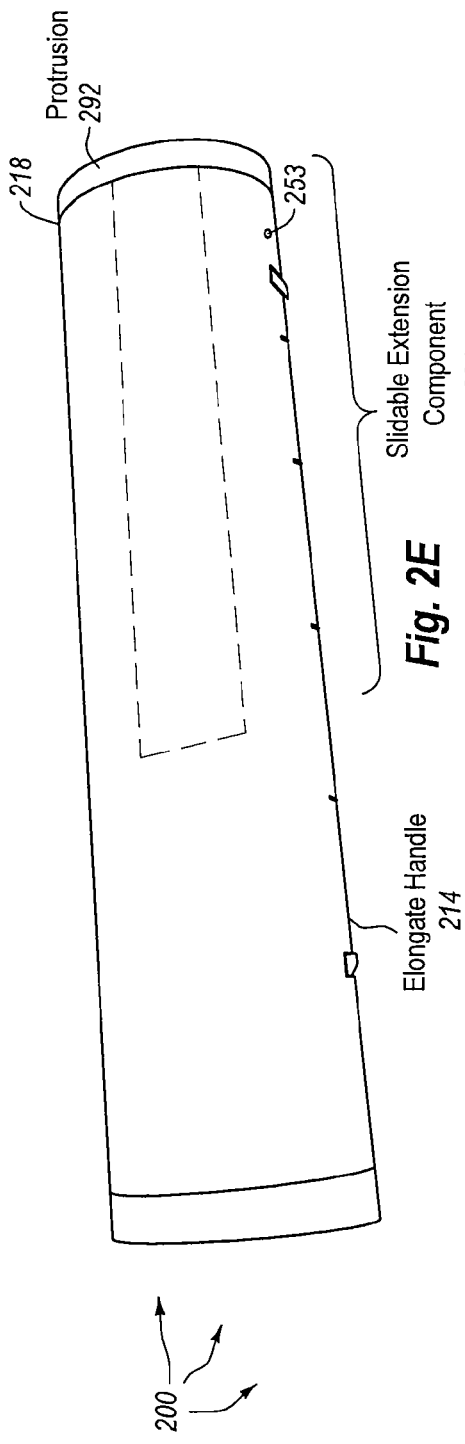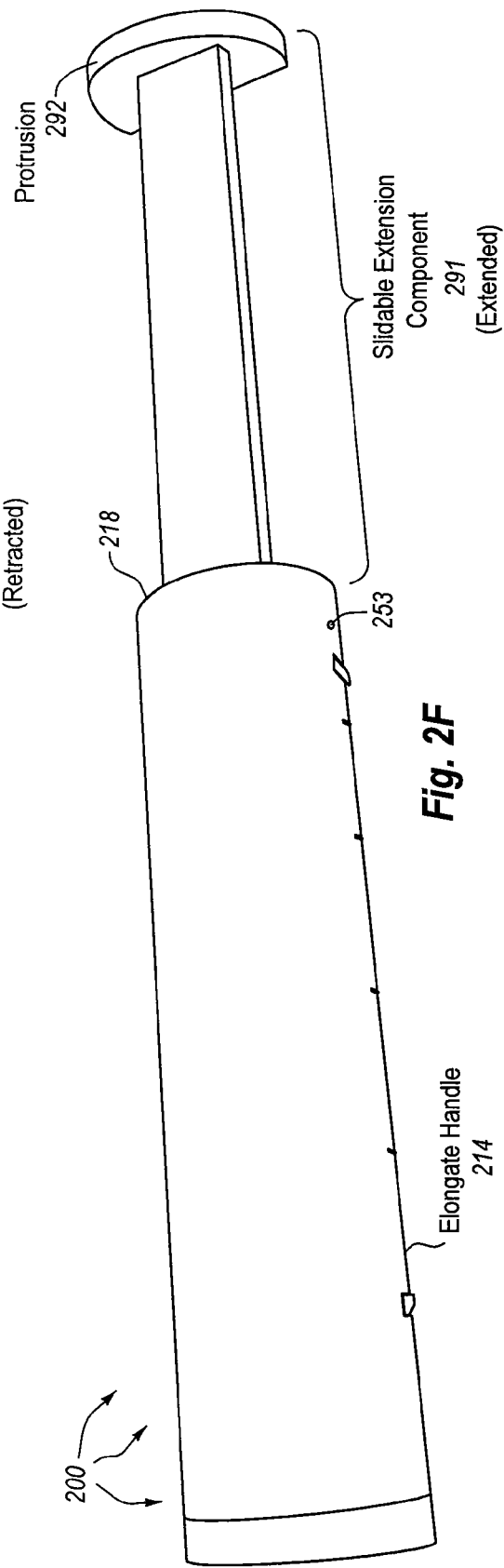

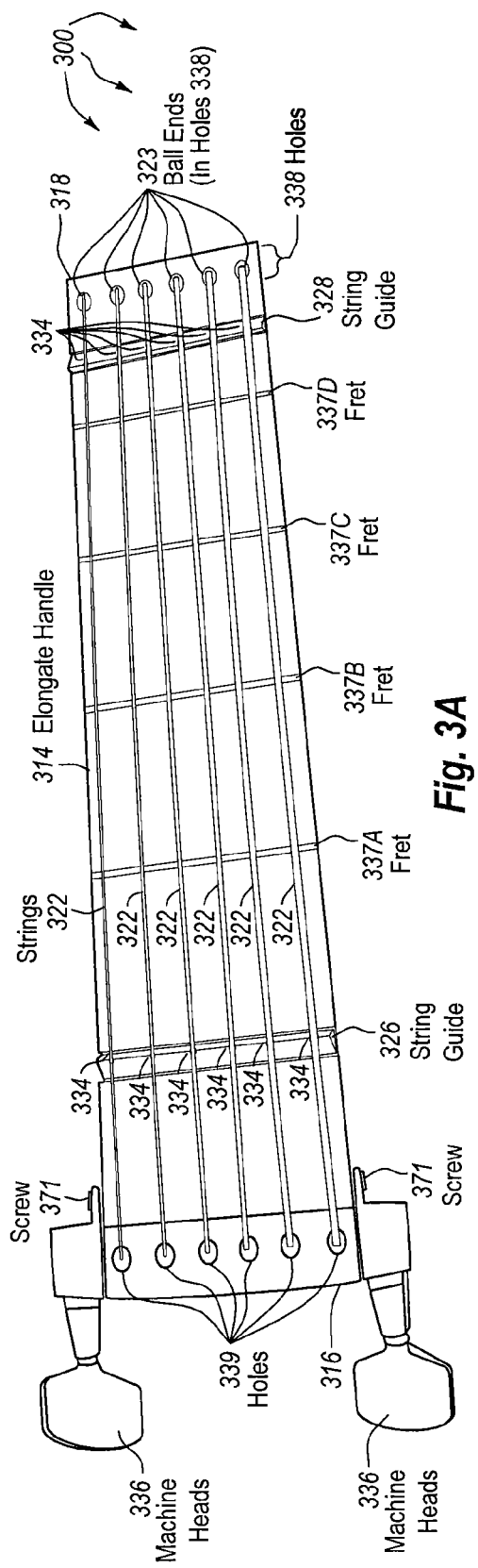
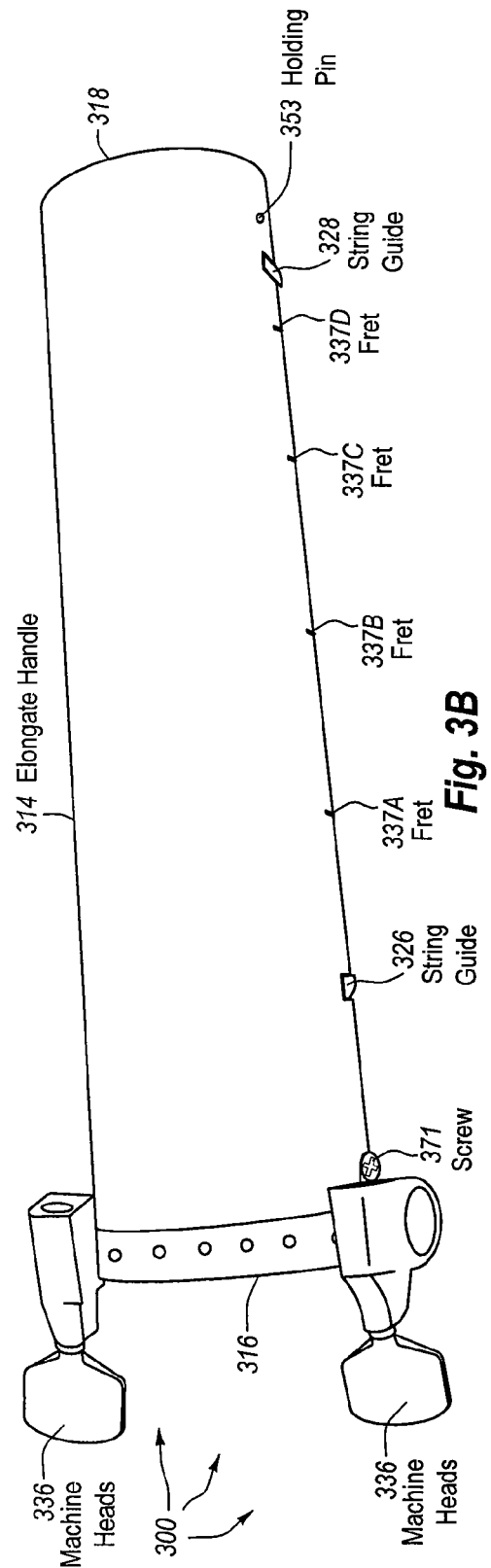
Fig. 3A
Fig. 3B

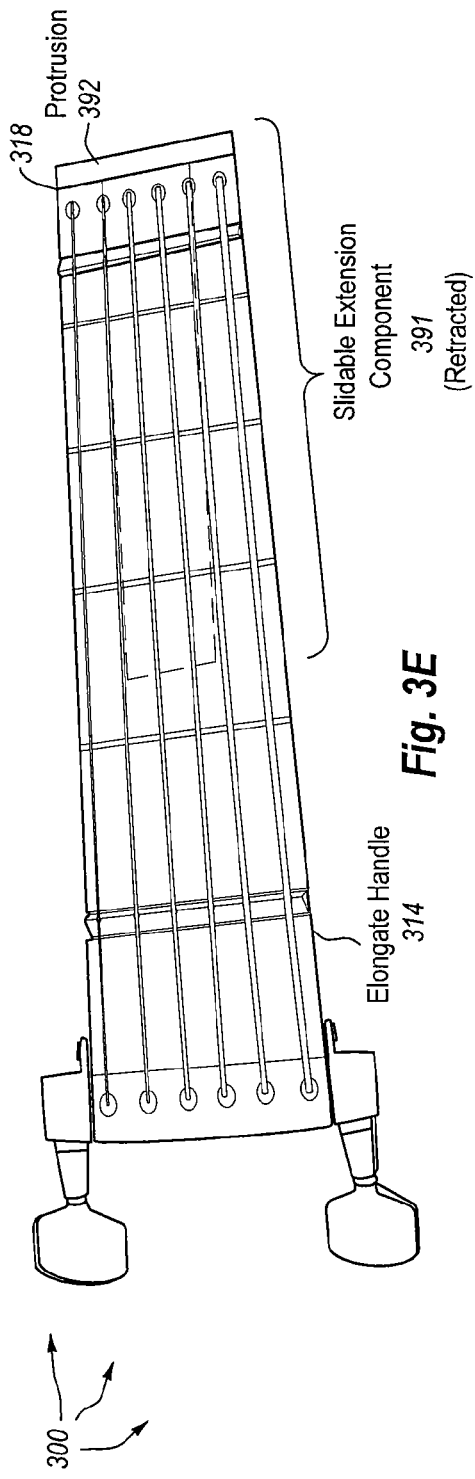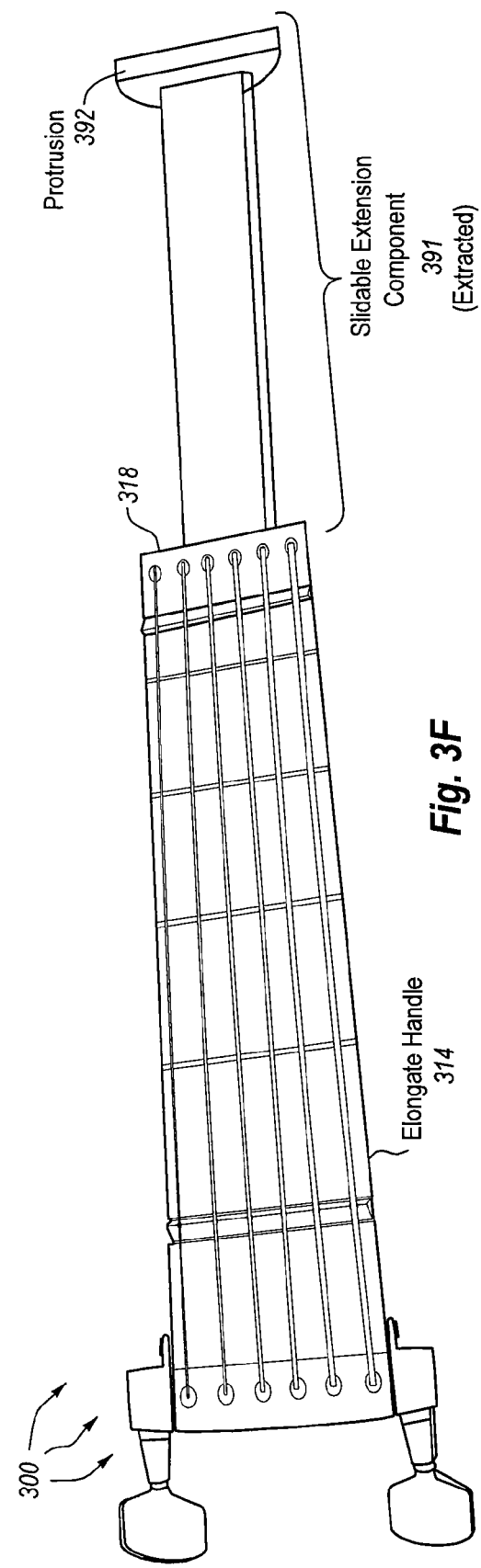

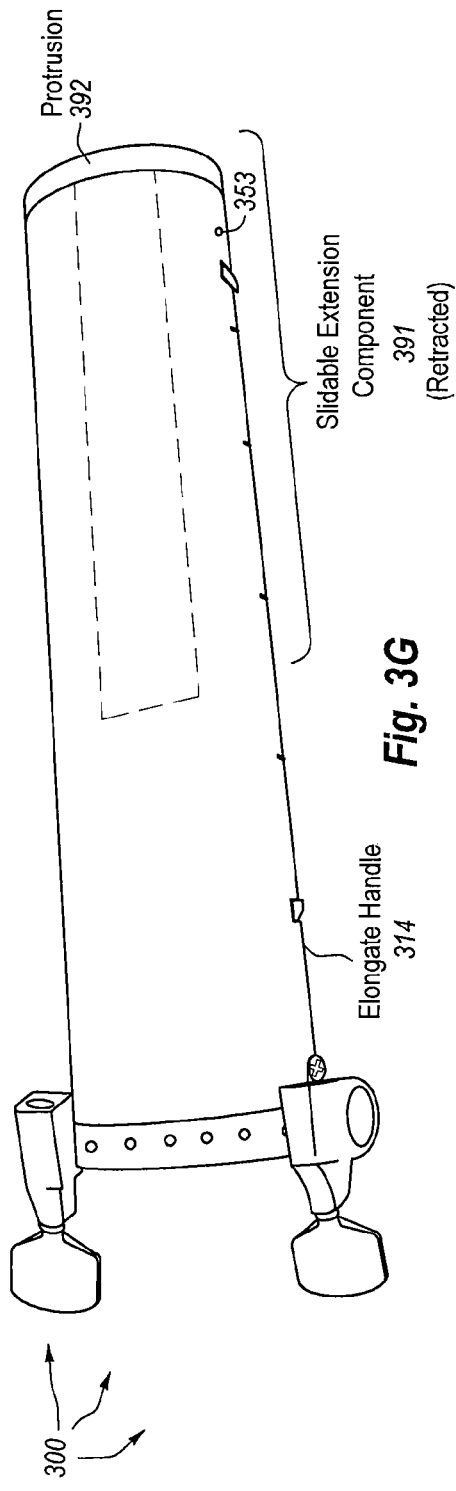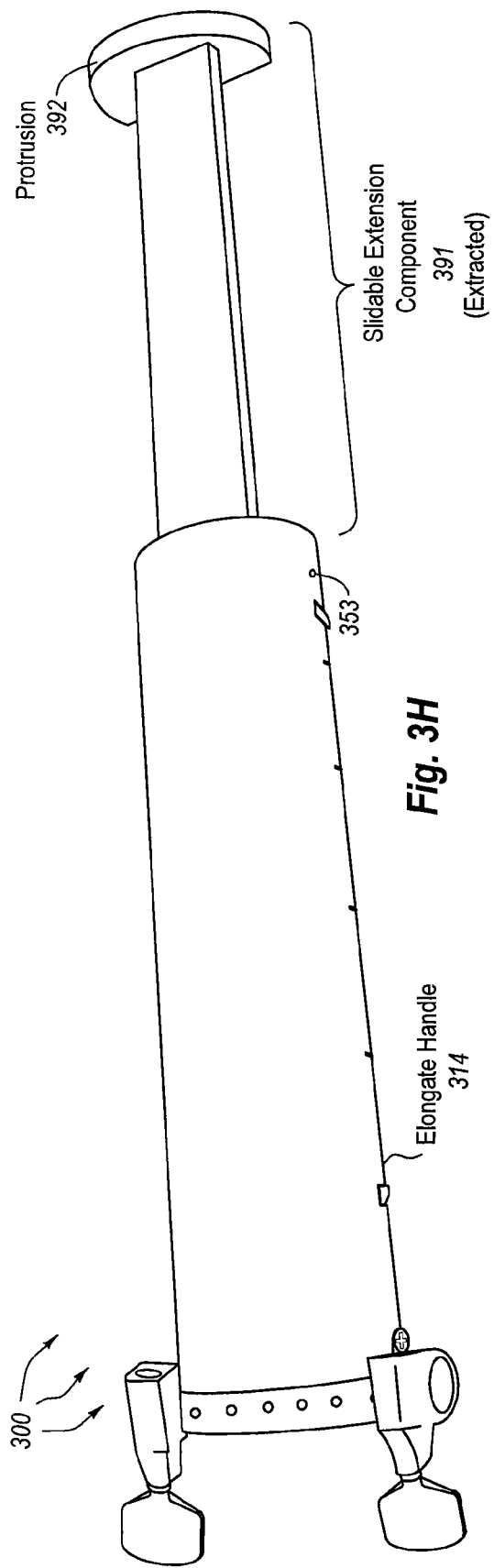
Fig. 3G
Fig. 3H

STRINGED INSTRUMENT PRACTICE DEVICE

CROSS-REFERENCE TO RELATED APPLICATIONS

This application is a continuation of U.S. patent application Ser. No. 12/904,861, now U.S. Pat. No. 8,124,863, entitled "Stringed Instrument Practice Device", filed on Oct. 14, 2010. That application claims the benefit of U.S. Provisional Patent Application Ser. No. 61/261,616, entitled "Stringed Instrument Practice Device", filed on Nov. 16, 2009. Both applications are incorporated by reference herein in their entirety.

BACKGROUND

Background and Relevant Art

Many stringed instruments (such as, guitars, bass-guitars, violins, violas, cellos, basses, double-basses, mandolins, ukuleles, banjos, etc.) necessitate that the player use his or her fingers to press the strings against a neck/fingerboard in order to produce different chords/notes. Unfortunately, learning the hand/finger positions necessary to make these chords/notes is often a difficult and arduous task for many students learning to play these instruments. Generally, students are simply required to practice these fingerings by "trial and error" until they become natural and memorized.

Due at least in part to the difficulties in learning these finger positions, many devices have been designed to help students more readily recognize and learn these fingerings. However, many of these previously known practice devices are relatively large in size, difficult to use, are not portable/handheld, and do not accurately represent the "look and feel" of the actual instrument. For example, many practice devices have differing strings, contour, and/or fret spacing from their corresponding stringed instrument.

Some practice devices, although smaller than an actual stringed instrument, are still relatively large. This larger size limits to some extent where the practices devices can be used. The required orientation of these practices devices for performing meaningful practice may also be less than ideal when compared to an actual stringed instrument. For example, some guitar practice devices can require the portion of the practice device used to modify string tension to be placed near a user's strumming hand during practicing.

BRIEF SUMMARY

The present invention extends to handheld practice devices for practicing to play stringed instruments, including various instruments in the chordophone family, such as, for example, electric guitars, acoustic guitars, violins, violas, cellos, basses, double-basses, mandolins, ukuleles, banjos, etc. More specifically, the present invention relates to a practice device that may assist a user in learning how to properly finger and play a stringed musical instrument.

Embodiments of the invention include a stringed instrument practice device. The stringed instrument practice device includes an elongate handle having a first end and a second end. The elongate handle is configured to represent a portion of the neck area of a stringed instrument where a user can depress strings against the neck of the string instrument with their fingers in various different combinations. The elongate handle can be specifically configured for practicing a particular type of stringed instrument. For example, an elongate handle for practicing guitar can include a plurality of frets of a guitar neck. The frets can be spaced and sized as they would be on an actual guitar.

The stringed instrument practice device also includes at least four strings. Each of the four strings is strung (stretched) between and is mechanically connected to a portion of the first end of the elongate handle and to a portion of the second end of the elongate handle. The number and arrangement of strings can be specifically configured for practicing a particular type of stringed instrument. For example, six strings can be strung on an appropriate elongate handle for practicing guitar. The strings can be spaced and tensioned as they would be on an actual guitar. Accordingly, a user can place an arrangement of one or more fingers on the strings of a practice device as a way of practicing placement of the arrangement of one or more fingers on the corresponding actual stringed instrument (e.g., to make a chord).

In some embodiments, there is a hollow area within the interior of the elongate handle. The hollow area has an opening on one end of the elongate handle. A slidable extension component can be housed within the interior hollow area. A protruding portion of the slidable extension component protrudes out of the opening. The protruding portion provides a mechanism to pull the slidable extension component out of the interior hollow area, extending the slidable extension component outwardly from the elongate body. The protruding portion can also be used to push (retract) the slidable extension component (e.g., back) into the interior hollow area.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B illustrate views of another example stringed instrument practice device.

FIGS. 2C-2F illustrate of the stringed instrument practice device of FIGS. 2A and 2B including a slidable extension component FIGS. 3A and 3B illustrate views of another example stringed instrument practice device.

FIGS. 3E-3H illustrate of the stringed instrument practice device of FIGS. 3A and 3B including a slidable extension component

DETAILED DESCRIPTION

Figure 1:
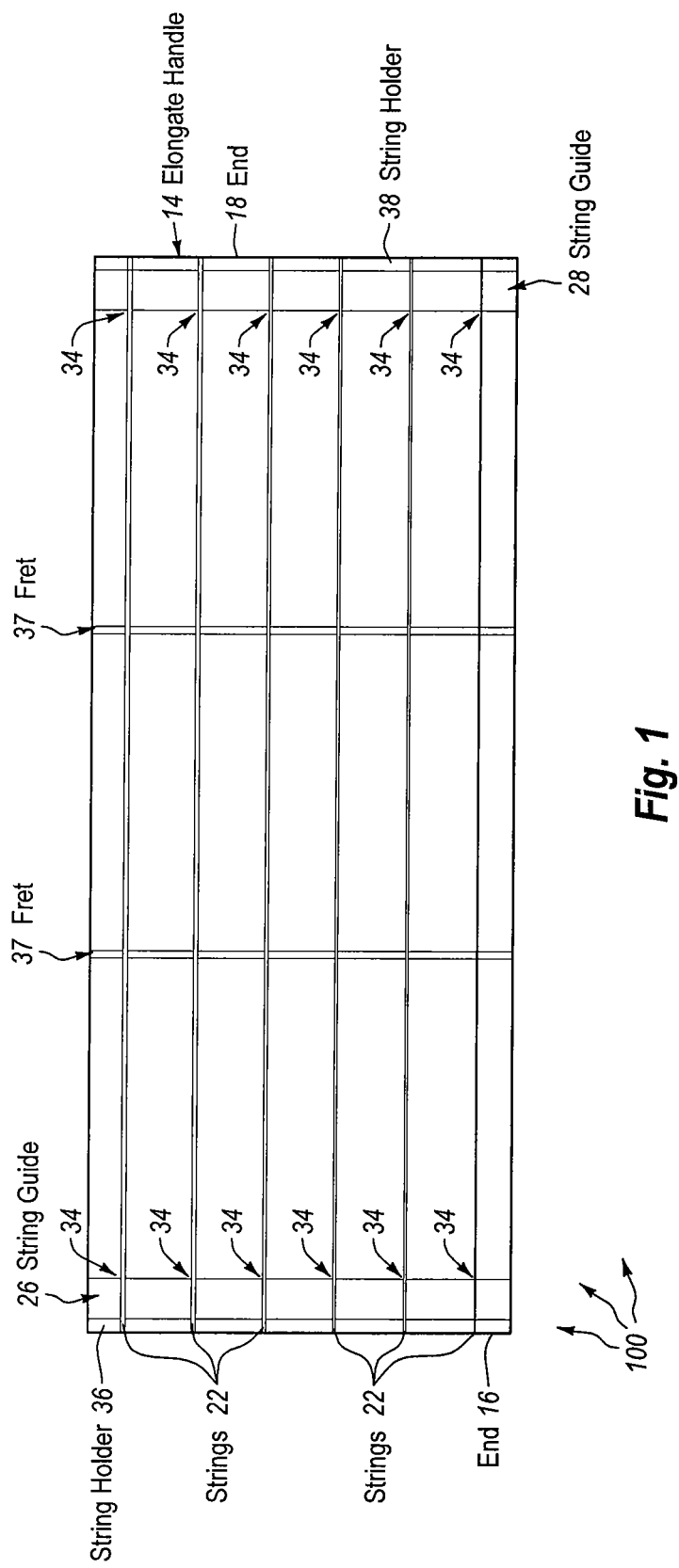
FIG. 1 illustrates an example stringed instrument practice device.

The present invention extends to handheld practice devices for practicing to play stringed instruments, including various instruments in the chordophone family, such as, for example, electric guitars, acoustic guitars, violins, violas, cellos, basses, double-basses, mandolins, ukuleles, banjos, etc. More specifically, the present invention relates to a practice device that may assist a user in learning how to properly finger and play a stringed musical instrument.

Embodiments of the invention include a stringed instrument practice device. The stringed instrument practice device includes an elongate handle having a first end and a second end. The elongate handle is configured to represent a portion of the neck area of a stringed instrument where a user can depress strings against the neck of the string instrument with their fingers in various different combinations. The elongate handle can be specifically configured for practicing a particular type of stringed instrument. For example, an elongate handle for practicing guitar can have dimensions of an actual guitar neck and include a plurality of frets of a guitar neck. The frets can be spaced and sized as they would be on an actual guitar neck.

The stringed instrument practice device also includes at least four strings. Each of the four strings is strung (stretched) between and is mechanically connected to a portion of the first end of the elongate handle and to a portion of the second end of the elongate handle. The number and arrangement of strings can be specifically configured for practicing a particular type of stringed instrument. For example, six (or twelve) strings can be strung on an appropriate elongate handle for practicing guitar. The strings can be spaced and tensioned as they would be on an actual guitar. Accordingly, a user can place an arrangement of one or more fingers on the strings of a practice device as a way of practicing placement of the arrangement of one or more fingers on the corresponding actual stringed instrument (e.g., to make a chord).

In some embodiments, there is a hollow area within the interior of the elongate handle. The hollow area has an opening on one end of the elongate handle. A slidable extension component can be housed within the interior hollow area. A protruding portion of the slidable extension component protrudes out of the opening. The protruding portion provides a mechanism to pull the slidable extension component out of the interior hollow area, extending the slidable extension component outwardly from the elongate body. The protruding portion can also be used to push (retract) the slidable extension component (e.g., back) into the interior hollow area.

For example, a user of a stringed instrument practice device can grip the protruding portion and pull to extend the slidable extension from within the hollow area prior to practicing. During practicing, the user can rest the slidable extension against part of their body to provide support for the stringed instrument practice device. When practicing is complete, the user can push the slidable extension back into the hollow area. Accordingly, the stringed practice device is configured (when not including a slidable extension) or is configurable (when including a slidable extension) to take up less space and be more easily transportable.

A stringed instrument practice device without a slidable extension can be used to practice in more confined spaces. A stringed practice device with a slidable extension can also be used to practice in more confined spaces by limiting the extension of or not extending the slidable extension.

FIG. 1 illustrates an example stringed instrument practice device 100. Practice device 100 is configured to assist a user in learning the finger positions that are used to play a musical stringed instrument, such as, for example, a guitar. However, embodiments of the invention include stringed practice devices to assist the a user in learning how to play other types of stringed instruments including bass-guitars, violins, violas, cellos, basses, double basses, mandolins, ukuleles, banjos, etc.

As depicted, stringed instrument practice device 100 includes elongate handle 14 (including ends 16 and 18), strings 22, frets 37, string guides 26 and 28, and string holders 36 and 38. Generally, each different component of stringed instrument practice device 100 can be made of a different material or different materials, including plastics, metals, metal alloys, woods, glass, graphite, corian, nylon, fluorocarbons, animal products (including bone), plant products, as well as combinations of one or more of these materials. In some embodiments, different components of stringed instrument practice device 100 are made from similar (or even the same) materials used to make stringed instruments for which it is used for practice. For example, when stringed instrument practice device 100 is to be used to practice guitar, the components of stringed instrument practice device 100 can be constructed from materials used to make a guitar.

Elongate handle 14 can be configured similar to the neck or fingerboard of an actual stringed instrument, such as, for example, the neck of a guitar, banjo, ukulele, or mandolin or the fingerboard of a violin, viola, cello, bass, double bass, etc. Elongate handle 14 is configured to be handheld. That is, the size and configuration of elongate handle 14 are for holding in a user's hand. However, it should be understood that this does not necessarily mean that the whole of elongate handle 14 fits entirely within the user's hand. For example, although a portion of elongate handle 14 is held within the user's hand, end 16 and/or end 18 can extend past the end of the user's hand when elongate handle 14 is held by a user.

The length of elongate handle 14 can vary depending on one or more of: the type of stringed instrument it represents, how much of the neck or fingerboard of a stringed instrument is required for meaningful practice (e.g., how many frets are used to form chords), space requirements of a practice area, and desired level of portability. In some embodiments, elongate handle 14 is less than six inches in length. In other embodiments, elongate handle 14 is between four and five inches in length. In further embodiments, elongate handle 14 is sized and configured specifically for fitting in a pocket (e.g., a pants or shirt pocket).

In some embodiments, elongate handle 14 is a single component combining a neck portion along with a fingerboard or fret board on top of the neck portion. For example, a neck portion and topside fret board can be constructed from a single piece of wood or other material. Alternately, in other embodiments, a neck portion and fingerboard or fret board are independently constructed (possible from different materials)

and then the fingerboard or fret board is secured (e.g., glued) onto the top of the neck portion. The neck portion can be constructed from wood, graphite, aluminum, carbon fiber, etc. The fingerboard or fret board can be constructed from wood, such as, for example, rosewood, ebony, maple, or composite materials, such as, for example, high pressure laminate ("HPL") or resin.

In some embodiments, elongate handle 14 includes multiple sections that are connected to one another to form elongate handle 14. For example, elongate handle 14 can include two or more separate sections (each section constructed as a single component or including separately constructed components that were subsequently attached together) that are joined together to provide the full-sized elongate handle 14, for practicing purposes. The multiple sections of elongate handle 14 can be hingedly coupled together, permitting elongate handle 14 to fold into an even more compact configuration when stored, and unfolded into the depicted configured for use as a practicing device. Other mechanisms, such as, for example, a dowel pin and hole system, can also be used to join the multiple sections into elongate handle 14.

Stringed instrument practice device 100 can include at least four strings that are mechanically secured to elongate handle 14. As depicted in FIG. 1, strings 22 (six strings) are mechanically connected to elongate handle 14. Strings 22 are strung across the elongate handle 14 extending between end 16 and end 18. Strings 22 can be strings that are otherwise usable on an actual stringed instrument. Strings 22 can also be matched to the type of stringed instrument for which stringed instrument practice device 100 is to be used for practice. For example, strings 22 can be guitar strings when stringed instrument practice device 100 is to be used for practicing guitar.

The use of appropriate strings enhances a user's practice experience. For example, using real instrument strings matched to a specific stringed instrument provides a more realistic experience to a user when they practice. The use of real instrument strings on stringed instrument practice device 100 also permits a user's finger tips to adjust to the feel/toughness of the instrument strings in preparation for playing a stringed instrument. Strings can constructed from animal products (e.g., used to make gut strings), plant products, polymer materials, such as, for example, nylon and fluorocarbon, metals, and metal alloys incorporating steel, nickel, or phosphor bronze. Strings can also be constructed from a combination of materials, such as, for example, a stranded synthetic core (e.g., Perlon or other nylon) wound with various metals or a (solid or stranded) steel core wound with various other metals.

As depicted, string guides 26 and 28 are used to space strings 22 from one another at ends 16 and 18 respectively. The strings can be pulled with sufficient tension such that string spacing provided by string guides 26 and 28 remains essentially the same along the length of elongate handle 14. String guides 26 and 28 can be made of plastic or other appropriate materials. String guides 26 and 28 include grooves 34 that align strings 22 in specified positions on elongate handle 14 and also prevent the strings from moving along the width of elongate handle 14. String guides 26 and/or 28 can be or represent a nut or saddle of an actual guitar. String guides can be constructed from bone, plastic, brass, corian, graphite, stainless steel, or other appropriate materials.

String holders 36 and 38 are used to mechanically secure strings 22 to elongate handle 14 at ends 16 and 18 respectively. Various mechanisms, such as, for example, glue, screws, clamps, etc., can be used to mechanically secure strings 22 to elongate handle 14. String holders 36 and 38 are used to maintain (and potentially adjust) tension in strings 22 and also prevent the strings from moving along the length of elongate handle 14. In some embodiments, string holders 36 and 38 are similar to a bridge.

As depicted, stringed instrument practice device 100 also includes a number of frets 37. Frets 37 are positioned along the handle 14 and are designed to guide the user in positioning their hands and/or fingertips (e.g., to form chords). Frets 37 can be added to embodiments that correspond to guitars or other stringed instruments that include frets. For embodiments corresponding to other stringed instruments (e.g., violin, cello, and the like), frets 37 can be omitted. Frets can be constructed from (e.g., jumbo or medium) fret wire of various different heights. In some embodiments, fret wire is nickel alloy or stainless steel.

FIGS. 2A and 2B illustrate views of another example stringed instrument practice device 200. FIG. 2A depicts a view of the front side of stringed instrument practice device 200 (or the side of stringed instrument practice device 200 that faces away from a user when practicing). FIG. 2B depicts a view of the back side of stringed instrument practice device 200 (or the side of stringed instrument practice device 200 that faces toward, and possibly rests against, a user when practicing).

As depicted in FIG. 2A, stringed practice device 200 includes elongate handle 214 (including ends 216 and 218), strings 222, frets 237A-237D, string guides 226 and 228, and screws 235 and nuts 236 and holes 238. Elongate handle 214 is constructed from a single piece of wood and combines a neck portion along with a fret board on top of the neck portion. Frets 237A-237D are similar to frets 37. String guides 226 and 228 are similar to string guides 26 and 28 and include grooves 234.

Strings 222 are similar to strings 22. Each of strings 222 also includes a ball end 223, such as, for example, a brass or plastic ball, nut, or ferrule, affixed to one end of the string. End 218 of elongate handle 214 includes holes 238. Holes 238 can be of sufficient size to permit the ball ends 223 to be inserted into holes 238. After ball ends 223 are inserted into holes 238, glue can be applied to secure ball ends 223 in place within holes 238. Alternately, holding pin 253 can be run through holes of the ball ends 238 to secure strings 222 within holes 238.

End 216 of elongate handle 214 includes screws 235 and corresponding nuts 236. Each of strings 222 can be pulled through a nut 236 and the corresponding screw 235 can be tightened down on top of the string 222 to secure the string 222 in place. Strings 222 can be properly tensioned to represent a specified type of stringed instrument.

As depicted in FIG. 2B, the back side of stringed instrument practice device 200 is rounded to represent neck of a guitar. However, the back side of stringed instrument practice device 200 can be formed to represent the neck of virtually any stringed instrument. Holding pin 253 can be run through holes of ball ends 223 to secure strings 222.

FIGS. 2C-2F illustrate the stringed instrument practice device 200 including a slidable extension component. FIGS. 2C and 2D depicted a view of the front side of stringed instrument practice device 200 (or the side of stringed instrument practice device 200 that faces away from a user when practicing). FIGS. 2E and 2F depicts a view of the back side of stringed instrument practice device 200 (or the side of stringed instrument practice device 200 that faces toward, and possibly rests against, a user when practicing).

As depicted in FIG. 2C, as indicated by the dashed lines, slidable extension component 291 is retracted into and contained within a hollow area in stringed instrument practice device 200. Protrusion 292 remains external to the hollow area, and potentially contacts end 218, when slidable extension component 291 is retracted. As depicted in FIG. 2D, slidable extension component 291 is extend out from within the hollow area, providing additional support area that can rest against a user when practicing.

Similarly, as depicted in FIG. 2E, as indicated by the dashed lines, slidable extension component 291 is retracted into and contained within the hollow area in stringed instrument practice device 200. Protrusion 292 remains external to the hollow area, and potentially contacts end 218, when slidable extension component 291 is retracted. As depicted, in FIG. 2F, slidable extension component 291 is extend out from within the hollow area, providing additional support area that can rest against a used when practicing.

FIGS. 3A and 3B illustrate views of an example stringed instrument practice device 300. FIG. 3A depicts a view of the front side of stringed instrument practice device 300 (or the side of stringed instrument practice device 300 that faces away from a user when practicing). FIG. 3B depicts a view of the back side of stringed instrument practice device 300 (or the side of stringed instrument practice device 300 that faces toward, and possibly rests against, a user when practicing).

As depicted in FIG. 3A, stringed practice device 300 includes elongate handle 314 (including ends 316 and 318), strings 322, frets 337A-337D, string guides 326 and 328, machine heads 336, and holes 338. Elongate handle 314 is constructed from a single piece of wood and combines a neck portion along with a fret board on top of the neck portion. Frets 337A-337D are similar to frets 37. String guides 326 and 328 are similar to string guides 26 and 28 and include grooves 334.

Strings 322 are similar to strings 22. Each of strings 322 also includes a ball end 323, such as, for example, a brass or plastic ball, nut, or ferrule, affixed to one end of the string. End 318 of elongate handle 314 includes holes 338. Holes 338 can be of sufficient size to permit the ball ends 323 to be inserted into holes 338. After ball ends 323 are inserted into holes 338, glue can be applied to secure ball ends 323 in place within holes 338. Alternately, holding pin 353 can be run through holes of the ball ends 338 to secure strings 322 within holes 338.

End 316 of elongate handle 314 includes holes 339 and machine heads 336. Holes 339 can be of sufficient size to permit the ends of strings 222 to be inserted into holes 339. The strings can then be run through holes in a corresponding machine head 336. As depicted, each machine head 336 can be configured to accept three of strings 322 and be used to increase or decrease the tension in the strings it accepts. Screws 371 can be used to secure machine heads 336 to elongate handle 314.

As depicted in FIG. 3B, the back side of stringed instrument practice device 300 is rounded to represent neck of a guitar. However, the back side of stringed instrument practice device 300 can be formed to represent the neck of virtually any stringed instrument. Holding pin 353 can be run through holes of ball ends 323 to secure strings 322.

Figure 3C:
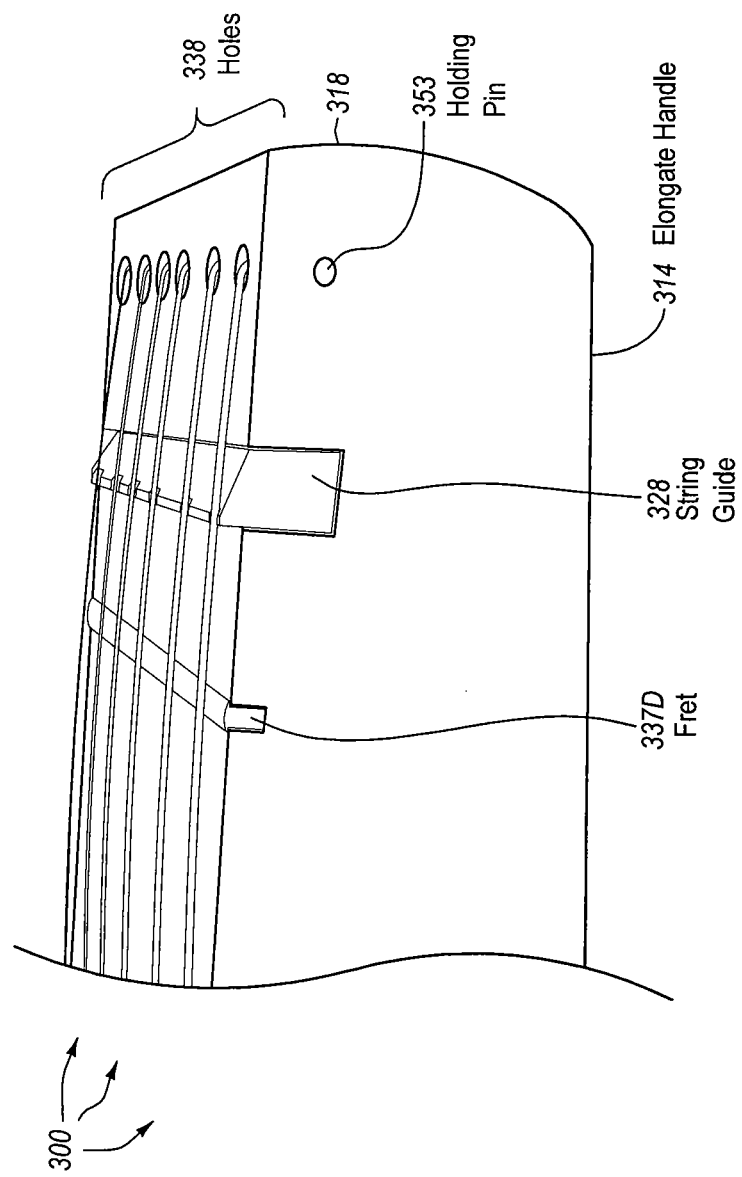
FIG. 3C illustrates a closer view of one end of a stringed instrument practice device.

FIG. 3C illustrates a closer view of end 318 end of stringed instrument practice device 300. As depicted holding pin 353 runs through elongate handle 314 to hold strings 322 in place within holds 338.

Figure 3D:
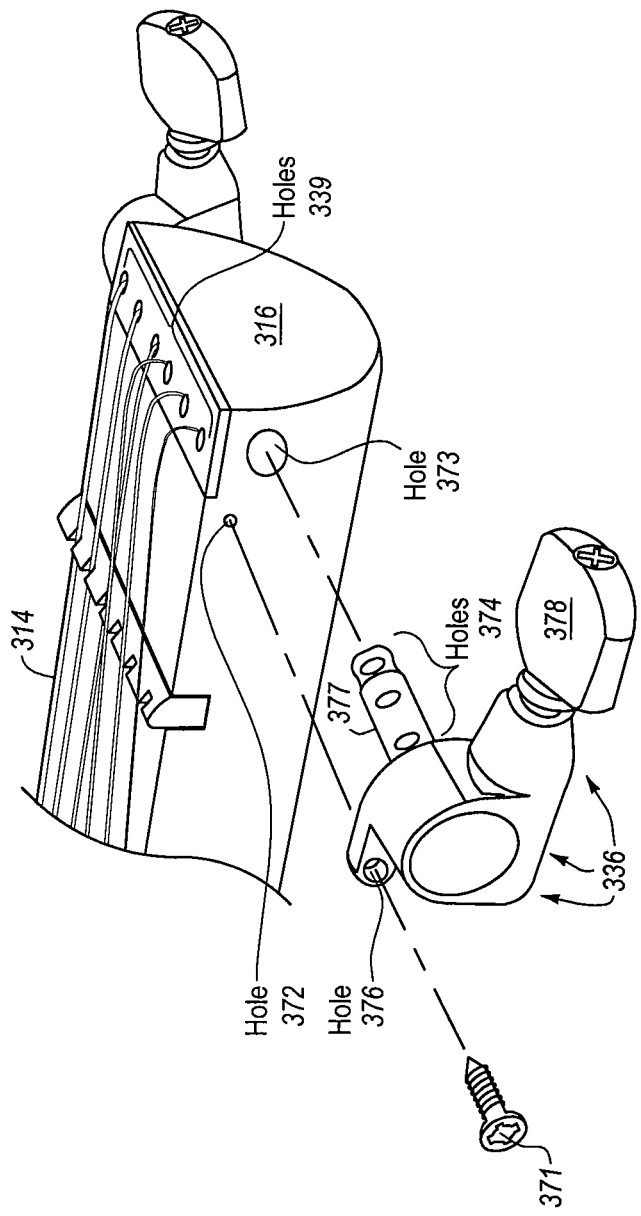
FIG. 3D illustrates a closer view of another end of a stringed instrument practice device.

FIG. 3D illustrates a closer view of end 316 of stringed instrument practice device 300. As depicted, member 377 is inserted into hole 373. Elongate member 377 includes holes 374. Each of holes 374 can accept a string (e.g., one of strings 322) run through one of the corresponding holes 339. Once strings are accepted, member 378 can be turned to increase or decrease tension in any accepted strings. Screw 371 is run through hole 376 and screwed into hole 372 to secure machine head 336 to elongate handler 314.

FIGS. 3E-3H illustrate of the stringed instrument practice device of FIGS. 3A and 3B including a slidable extension component. FIGS. 3E and 3F depicted a view of the front side of stringed instrument practice device 300 (or the side of stringed instrument practice device 300 that faces away from a user when practicing). FIGS. 3G and 3H depict a view of the back side of stringed instrument practice device 300 (or the side of stringed instrument practice device 300 that faces toward, and possibly rests against, a user when practicing).

As depicted in FIG. 3E, as indicated by the dashed lines, slidable extension component 391 is retracted into and contained within a hollow area in stringed instrument practice device 300. Protrusion 392 remains external to the hollow area, and potentially contacts end 318, when slidable extension component 391 is retracted. As depicted in FIG. 3F, slidable extension component 391 is extend out from within the hollow area, providing additional support area that can rest against a used when practicing.

Similarly, as depicted in FIG. 3G, as indicated by the dashed lines, slidable extension component 391 is retracted into and contained within the hollow area in stringed instrument practice device 300. Protrusion 392 remains external to the hollow area, and potentially contacts end 318, when slidable extension component 391 is retracted. As depicted, in FIG. 3H, slidable extension component 391 is extend out from within the hollow area, providing additional support area that can rest against a used when practicing.

Figure 4:
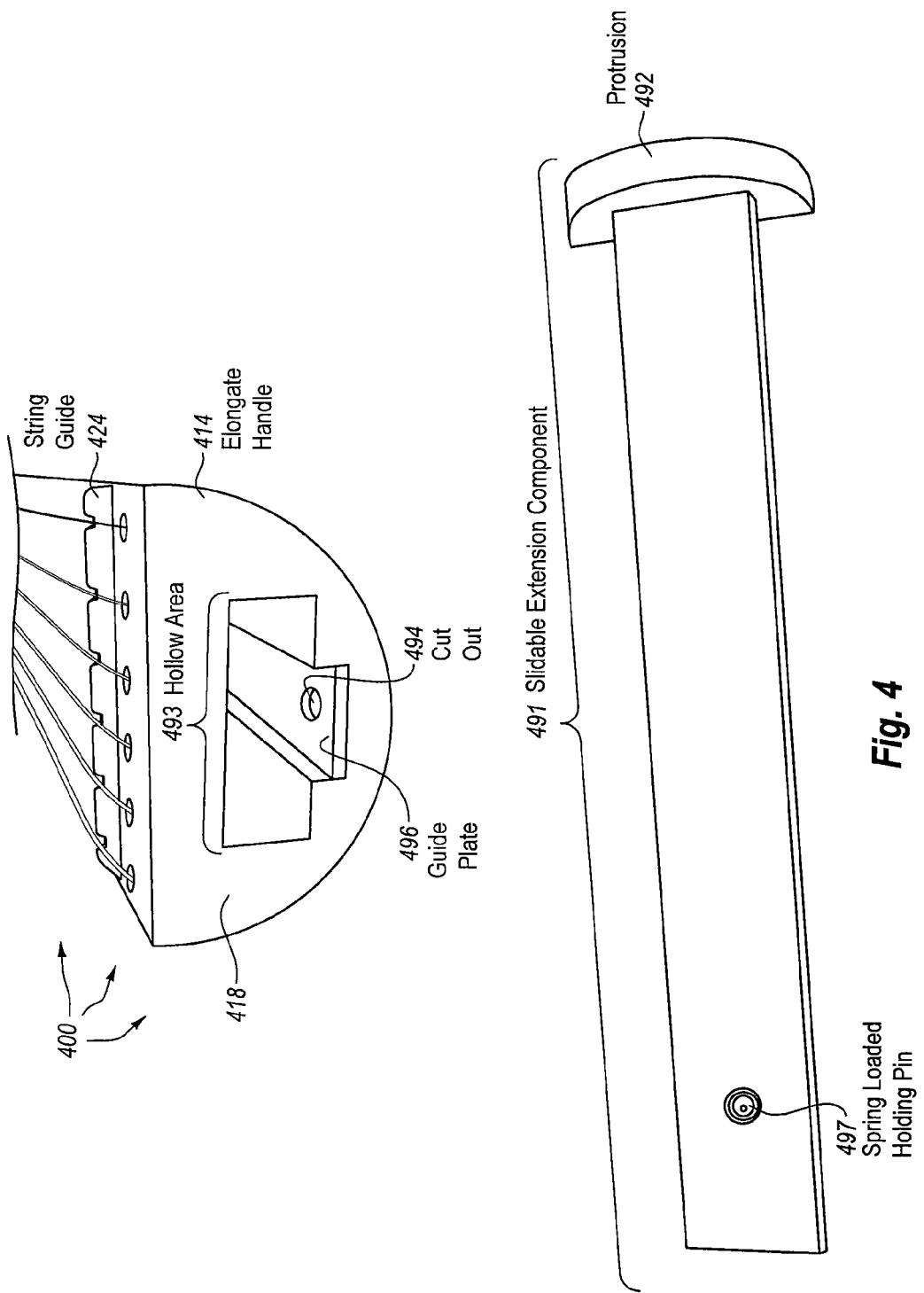
FIG. 4 illustrates a view of the end of stringed instrument practice device and slidable extension component.

FIG. 4 illustrates a view of end 418 of stringed instrument practice 400 and slidable extension component 491. Slidable extension component 491 includes protrusion 492. As depicted, hollow area 493 has been hollowed out from within elongate handle 414. Guide plate 496 can be made of a harder substance, such as, for example, metal. When slidable extension component 491 is within hollow area 493, slidable extension component 491 slides on guide plate 496.

During extension, when spring loaded holding pin 497 reaches cut out 494, spring loaded holding pin 497 expands to rest within cut out 494. When resting within cut out 494, spring loaded holding pin 497 secures slidable extension component 491. Securing slidable extension component 491 can prevent further unwanted movement (either extension or refraction) that may move slidable extension component 491 into an undesired position (e.g., during practice). However, slidable extension component 491 is not so tightly secured to prevent a user form intentionally moving slidable extension component 491, for example, to retract slidable extension component 491 back into hollow area 493 or fully remove slidable extension component 491 from within hollow area 493.

String guide 424 is similar to strings guides 324 and 224.

Accordingly, embodiments of the invention include a stringed practice device that can be used to practice established chords, finger picking methods, chord integration, and strengthening finger tips. Embodiments of the invention can be designed such that a user can hold an elongate handle and place one or more of his or her fingers on strings as a way of practicing the fingerings that are used to play the chords/notes of the stringed musical instrument. Embodiments permit a user to practice chord integration and finger-picking methods. Since real strings can be used, a stringed instrument practice device in accordance with the principles of the present invention also helps to strengthen a user's fingertips and get the fingertips accustomed to holding/pinching the instrument strings. Further, since string instrument practice device can be handheld, portable, and is sized to fit within the user's hand, a user can realize advantages of the invention and utilize practice methods while the user is "on the go," riding on a bus, watching television, waiting in line, etc.

Figure 5:
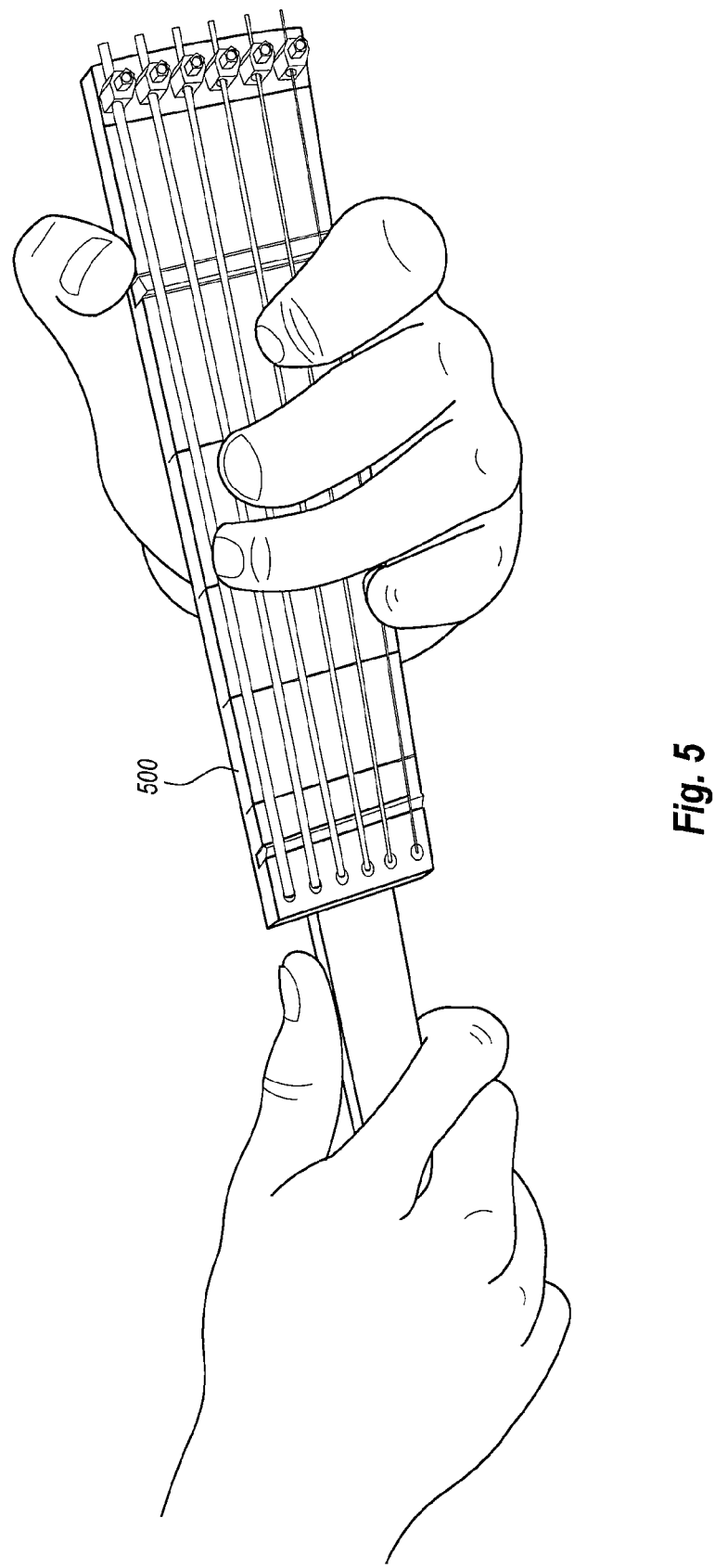
FIG. 5 illustrates a user practicing using a string instrument practice device.

FIG. 5 illustrates a user practicing using a string instrument practice device 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A device used to practice a stringed musical instrument, the device comprising:
    an elongate handle representing a neck portion of the stringed musical instrument, the elongate handle including a first end and a second end;
    a plurality of strings;
    a first string holder at the first end for holding strings in place;
    a second string holder at the second end for holding strings in place;
    wherein the plurality of strings are secured by the first and second string holders and run between the first end of the elongate handle and the second end of the elongate handle; and
    wherein the elongate handle further includes a hollow area within the elongate handle, the hollowing area having an opening at the second end of the elongate handle, the hollow area configured to house a slidable component that is slidable within the hollow area so as to extend away from the elongate handle and to retract into the elongate handle at the opening, the hollow area including cut out, the cut out configured to accept an expandable holding mechanism of the slidable component, the expandable holding mechanism for securing the slidable component when the slidable component is extended away from the elongate handle a specified distance.

2. The device as recited in claim 1, further comprising a slidable extension component, the slidable extension component including a protrusion that remains external to the hollow area even when the slidable extension component is fully retracted into the hollow area, the slidable extension component including the expandable holding mechanism.

3. The device as recited in claim 2, wherein the hollow area further comprises a guide plate, wherein the slidable extension slides on the guide plate when being extended away from or retracted into the elongate handle.

4. The device as recited in claim 3, wherein the guild plate comprises the cut out, wherein the cut out being configured to accept an expandable holding mechanism comprise the cut out being configured to accept a spring loaded holding pin, wherein the slidable extension component including the expandable holding mechanism comprises the slidable extension component including the spring loading holding pin, and wherein when the slidable extension component is extended away from the elongate handle the specified distance the spring loaded holding pin expands into the cut out to secure the slidable extension component at the specified distance.

5. The device as recited in claim 1, wherein the plurality of strings are musical strings designed for use with the stringed musical instrument.

6. The device as recited in claim 1, wherein the stringed musical instrument is a stringed musical instrument selected from among: a guitar, a bass-guitar, a violin, a viola, a cello, a bass, a double bass, a mandolin, and a banjo.

7. The device as recited in claim 1, wherein the elongate handle representing a neck portion of the stringed musical instrument comprises an elongate handle representing a neck portion of a guitar and wherein a top portion of the elongate handle includes a plurality of frets.

8. The device as recited in claim 1, wherein the plurality of strings comprise six strings.

9. The device as recited in claim 1, wherein the elongate handle representing a neck portion of the stringed musical instrument comprises an elongate handle representing a neck portion of a violin and wherein a top portion of the elongate handle includes a fingerboard.

10. The device as recited in claim 1, wherein the first string holder comprises for each of the plurality of strings a nut and screw that are used to secure the string at the first end of the elongate handle.

11. The device as recited in claim 1, wherein the first string holder comprises a plurality of machine heads, each machine head configured to accept at least two strings and secure the at least two strings at the first end of the elongate handle.

12. The device as recited in claim 1, wherein the second string holder comprises glue used to secure the plurality of strings at the second end of the elongate handle.

13. The device as recited in claim 1, wherein the plurality of strings comprise a plurality of strings, each of the plurality of strings having a ball end at one end;
    wherein the elongate handle includes a corresponding plurality of holes at the second end of the elongate handle, the holes of sufficient size that a ball end can fit into the holes; and
    wherein the second string holder comprises a holding pin that runs through the ball ends of the at least for strings to secure the plurality of strings at the second end of the elongate handle.

14. A device used to practice a stringed musical instrument, the device comprising:
    an elongate handle representing a neck portion of the stringed musical instrument, the elongate handle including a first end and a second end, the elongate handle sized and configured to fit in the hand of a user of the device;
    a plurality of strings;
    a first string holder at the first end for holding strings in place;
    a second string holder at the second end for holding strings in place;
    wherein the plurality of strings are secured by the first and second string holders and between the first end of the elongate handle and the second end of the elongate handle;
    wherein the elongate handle further includes a hollow area within the elongate handle, the hollow area including guide plate having a cut out, the cut configured to accept a spring loaded holding pin, the hollow area configured to house a component that is slidable within the hollow area to extend away from the elongate handle and to retract into the elongate handle when manipulated by the user; and
    a slidable extension component including a protrusion that remains external to the hollow area when the slidable extension component is retracted into the hollow area, the protrusion graspable by the user to slide the slidable extension component along the guide plate, the slidable extension component including a spring load holding pin, the spring loaded holding pin securing the slidable extension component within the hollow area when the slidable extension component is extended away from the elongate handle a specified distance.

15. The device as recited in claim 14, wherein the plurality of strings are musical strings designed for use with the stringed musical instrument, and constructed of one or more of: animal products, plant products, polymer materials, and metal alloys.

16. The device as recited in claim 14, wherein the stringed musical instrument is a stringed musical instrument selected from among: a guitar, a bass-guitar, a violin, a viola, a cello, a bass, a double bass, a mandolin, and a banjo.

17. A device used to practice playing guitar, the device comprising:
- an elongate handle representing a portion of a guitar neck, the elongate handle including a first end and a second end;
- a plurality of strings corresponding to the strings of a guitar;
- a first string holder at the first end for holding strings in place;
- a second string holder at the second end for holding strings in place;
- wherein the plurality of strings are secured by the first and second string holders and run between the first end of the elongate handle and the second end of the elongate handle; and
- wherein the elongate handle further includes a hollow area within the elongate handle, the hollowing area having an opening at the second end of the elongate handle, the hollow area configured to house a device support component that is slidable within the hollow area so as to extend away from the elongate handle to provide additional support for a user when practicing and to retract into the elongate handle at the opening when manipulated by the user, the hollow area including cut out, the cut out configured to accept an expandable holding mechanism of the device support component, the expandable holding mechanism for securing the device support component when the device component is extended away from the elongate handle a specified distance.

18. The device as recited in claim 17, further comprising a slidable extension component, the slidable extension component including a protrusion that remains external to the hollow area even when the slidable extension component is fully retracted into the hollow area, the slidable extension component including the expandable holding mechanism.

19. The device as recited in claim 18, wherein the slidable extension component is of sufficient length to provide additional support for the elongate handle when extended.

20. The device as recited in claim 17, further comprising:
- a first string guide at the first end;
- a second string guide at the second end;
- a portion of a fret board; and
- wherein the first and second string guides maintain appropriate spacing between each of the plurality of strings along the portion of the fret board.

* * * * *